（12） United States Patent
Inaba

(10) Patent No.: US 10,129,535 B2
(45) Date of Patent: Nov. 13, 2018

(54) STEREOSCOPIC IMAGE DISPLAY DEVICE AND STEREOSCOPIC IMAGE APPRECIATION EYEGLASSES

(76) Inventor: Minoru Inaba, Oyama (JP)

(*) Notice: Subject to any disclaimer, the term of this patent is extended or adjusted under 35 U.S.C. 154(b) by 1008 days.

(21) Appl. No.: 13/824,515

(22) PCT Filed: Jun. 6, 2011

(86) PCT No.: PCT/JP2011/063436
§ 371 (c)(1),
(2), (4) Date: Mar. 18, 2013

(87) PCT Pub. No.: WO2012/039166
PCT Pub. Date: Mar. 29, 2012

(65) Prior Publication Data
US 2013/0182088 A1 Jul. 18, 2013

(30) Foreign Application Priority Data
Sep. 21, 2010 (JP) ................ 2010-211006

(51) Int. Cl.
*G09G 3/20* (2006.01)
*H04N 13/337* (2018.01)
*G02B 27/22* (2018.01)
*G02B 27/26* (2006.01)
*G03B 35/16* (2006.01)
(Continued)

(52) U.S. Cl.
CPC ....... *H04N 13/337* (2018.05); *G02B 27/2264* (2013.01); *G02B 27/26* (2013.01); *G03B 35/16* (2013.01); *H04N 13/144* (2018.05); *H04N 13/341* (2018.05); *H04N 13/378* (2018.05); *H04N 2213/008* (2013.01)

(58) Field of Classification Search
CPC .......... H04N 13/0434; H04N 13/0296; H04N 13/0479; H04N 13/0459; H04N 2213/008
See application file for complete search history.

(56) References Cited
U.S. PATENT DOCUMENTS 5,596,403 A * 1/1997 Schiff .................... G01B 11/26
356/139.03
5,627,565 A 5/1997 Morishita et al. ............ 345/158
(Continued)

FOREIGN PATENT DOCUMENTS

JP 2002-082307 3/2002
JP 2010-004511 1/2010
(Continued)

*Primary Examiner* — Tat C Chio
*Assistant Examiner* — Fabio S Lima
(74) *Attorney, Agent, or Firm* — Fattibene and Fattibene LLC; Paul A. Fattibene

(57) ABSTRACT

An infrared polarizing filter is attached to an infrared synchronization signal radiator of a stereoscopic image display device which alternately displays right and left images by time-division with polarized light in one direction to radiate the polarized-light infrared synchronization signal. The problem with the occurrence of crosstalk is solved. Stereoscopic image appreciation eyeglasses have polarizing plates, visual field opening/closing liquid crystal cells and tilt correcting liquid crystal cells The synchronization signal is received by a receiver mounted on an eyeglass frame. The tilt correcting liquid crystal cells are adjusted based on the eyeglass frame tilt angle detected.

3 Claims, 8 Drawing Sheets

(51) Int. Cl.
*H04N 13/341* (2018.01)
*H04N 13/378* (2018.01)
*H04N 13/144* (2018.01)

(56) References Cited

U.S. PATENT DOCUMENTS

| | | | | |
|---|---|---|---|---|
| 5,819,207 A | * | 10/1998 | Takagi | G01D 5/345 |
| | | | | 340/630 |
| 2006/0061652 A1 | * | 3/2006 | Sato | H04N 13/0429 |
| | | | | 348/53 |
| 2009/0180194 A1 | | 7/2009 | Yamaguchi et al. | 259/630 |
| 2010/0134602 A1 | * | 6/2010 | Inaba | H04N 13/0059 |
| | | | | 348/58 |
| 2010/0201790 A1 | * | 8/2010 | Son | G02B 27/2264 |
| | | | | 348/53 |
| 2011/0012993 A1 | * | 1/2011 | Kuno | G09G 3/003 |
| | | | | 348/43 |
| 2011/0095989 A1 | * | 4/2011 | McGibney | G06F 3/03545 |
| | | | | 345/173 |
| 2011/0298900 A1 | | 12/2011 | Inaba | 348/47 |
| 2012/0257024 A1 | | 10/2012 | Inaba | 348/49 |
| 2012/0313936 A1 | * | 12/2012 | Matsumoto | G02B 26/0883 |
| | | | | 345/419 |

FOREIGN PATENT DOCUMENTS

| JP | 2010-004530 | | 1/2010 |
|---|---|---|---|
| JP | 2010004511 A | * | 1/2010 |

\* cited by examiner (a)

(b)

STEREOSCOPIC IMAGE DISPLAY DEVICE AND STEREOSCOPIC IMAGE APPRECIATION EYEGLASSES

TECHNICAL FIELD

The present invention relates to a stereoscopic image display device that alternately displays right and left images composing a stereoscopic image by time division with linear polarized light in one direction, and stereoscopic image appreciation eyeglasses for separating right and left visual fields of the displayed stereoscopic image to perform stereoscopic viewing, and particularly, to the prevention of a crosstalk that may occur when the linear polarized light is used.

BACKGROUND ART

Conventionally, to separate right and left visual fields of a stereoscopic image, the right and left visual fields are displayed one over the other (by projection) by right and left linear polarized lights, which are orthogonal to each other, or right and left circular polarized lights, which rotate in opposite directions, and are separately viewed using polarization eyeglasses, the right and left sides of which are orthogonal to each other, or circular polarization eyeglasses, the right and left of which rotate in opposite directions, depending on a display system, to appreciate the stereoscopic image. However, in recent years, as a writing speed of a direct view type display (particularly, an LCD (Liquid Crystal Display)) has increased, right and left images composing a stereoscopic image have been alternately displayed by time division even in a direct view type LCDTV (Liquid Crystal Display Television) or the like, and an attempt to separate right and left visual fields by visual field separating eyeglasses (e.g., liquid crystal shutter eyeglasses) to perform stereoscopic viewing has been made.

However, the liquid crystal shutter eyeglasses use two polarizing plates one over the other, and thus has the disadvantage in that transmitted light is significantly attenuated and the visual fields become dark. Moreover, the shutter eyeglasses guide a light beam (polarized light beam), which has been transmitted by the polarizing plate on their front surface in a direction orthogonal to a direction of the polarizing plate on their rear surface when the visual fields are closed, to alternately open and close the visual fields. Due to such a shutter function, an opening time becomes one-half or less and a light amount is attenuated. This shutter function intermits not only a stereoscopic image but also surrounding environmental light. Therefore, the problem that a flicker occurs under illumination, which is turned on at a commercial frequency, has been pointed out.

In the direct view type display, the right and left images are difficult to simultaneously display (however, images to be displayed by polarized lights in different directions for each line exist). Therefore, it has also been proposed that the right and left images are displayed by time division by linear polarized light in one direction and are separately viewed by devising eyeglasses on the appreciation side.

However, if the viewer tilts his/her head at his/her destiny using linear polarized light, it is difficult to avoid a program of a crosstalk (e.g., Patent literature 1).

Further, a person's eyesight (diopter) differs from individual to individual. However, there are no existing stereoscopic image appreciation eyeglasses including a diopter correction lens. Therefore, the stereoscopic image eyeglasses are overlaid on eyeglasses usually used when used in the present circumstances.

CITATION LIST

Patent Literature

Patent Literature 1: Japanese patent Application Laid-Open No. 2002-82307

SUMMARY OF INVENTION

Technical Problem

As described in the foregoing column [background art], a problem of appreciation eyeglasses for viewing a stereoscopic image of a type of being displayed by time division on one screen includes the following two points, as can be seen in liquid crystal shutter eyeglasses:
 a: A visual field is dark.
 b: A flicker occurs.
A method discussed in Patent literature 1 solves the above-mentioned two points in the problem occurring in the liquid crystal shutter eyeglasses while the following problem is newly raised:
 c: A crosstalk occurs.
This occurs when a viewer tilts his/her head. The shutter eyeglasses completely shield the visual fields using two polarizing plates orthogonal to each other when the visual fields are closed. On the other hand, in the method discussed in Patent literature 1, the visual fields are shielded when closed by a polarizing plate provided in a television set (in an LCDTV, display light itself is polarized light so that a new polarizing plate need not be provided on a front surface of the eyeglasses, as in Patent literature 1) and a polarizing plate in the eyeglasses. When the viewer tilts his/her head, therefore, an orthogonal state between the polarized light from an LCD and the polarizing plate in appreciation eyeglasses is destroyed. Thus, the occurrence of a crosstalk cannot be avoided.

If the stereoscopic image of a time division display type is appreciated, therefore, there occurs a technical subject to develop stereoscopic image appreciation eyeglasses capable of normal stereoscopic viewing by simultaneously solving the above-mentioned three problems. Therefore, the present invention is directed to solving this subject.

Solution to Problem

The invention as set forth in an embodiment provides a stereoscopic image display device that alternately displays right and left images by time division with polarized light in one direction, the stereoscopic image display device including an infrared light synchronization signal radiator for visual field opening/closing, and being further configured to radiate polarized infrared light used as a basis for tilt correction by attaching an infrared polarizing filter along the infrared light synchronization signal radiator for visual field opening/closing as a basis for tilt correction of stereoscopic image appreciation eyeglasses or separately installing the polarized infrared light radiator for tilt correction.

This configuration enables the polarized infrared light to be used as a basis for tilt correction of the stereoscopic image appreciation eyeglasses. If the right and left images are appreciated with the stereoscopic image appreciation eyeglasses for performing tilt correction using the polarized infrared light, a crosstalk can be prevented from occurring even if a viewer tilts his/her head.

The invention as set forth in another embodiment provides stereoscopic image appreciation eyeglasses, for appreciating a stereoscopic image composed of right and left images to be alternately displayed by a time-division system with linear polarized light, the amplitude direction of which is one direction, the stereoscopic image appreciation eyeglasses being configured so that polarizing plates in the same direction are respectively arranged side by side in right and left visual fields of the eyeglasses, and a visual field opening/closing liquid crystal cell and a tilt correcting liquid crystal cell for correcting the tilt of the eyeglasses are installed one over the other on a front surface of each of the polarizing plates, to receive a polarized infrared light synchronization signal (which need not be polarized if it includes only a synchronization signal) from a stereoscopic image display device by a synchronization signal receiver placed on an eyeglass frame to synchronously drive the visual field opening/closing liquid crystal cells using the synchronization signal while driving and adjusting the tilt correcting liquid crystal cells installed on the right and left visual fields of the eyeglasses using detection data of a tilt angle detector placed on the eyeglass frame so that a light-shielded state at the time of closing the visual fields always reaches its maximum even when the eyeglasses are tilted during appreciation, to prevent a crosstalk from occurring.

According to this configuration, the tilt angle detector automatically detects the tilt of the eyeglasses for the display image of the stereoscopic image display device, and the tilt correcting liquid crystal cell adjusts optical rotation of the display image according to a value obtained by the detection so that a tilted state is automatically corrected to a state similar to a horizontal state.

The invention as set forth in another embodiment provides stereoscopic image appreciation eyeglasses for appreciating a stereoscopic image composed of right and left images to be alternately displayed by a time-division system with linear polarized light, the amplitude direction of which is one direction, the stereoscopic image appreciation eyeglasses being configured so that polarizing plates in the same direction are respectively arranged side by side in right and left visual fields of the eyeglasses, and a liquid crystal cell is installed on a front surface of each of the polarizing plates, to calculate data representing a polarized infrared light synchronization signal radiated from a stereoscopic image display device and received by an infrared light synchronization signal receiver placed on an eyeglass frame and detection data of a tilt angle detector placed on the eyeglass frame, apply a voltage based on data obtained by the calculation to the liquid crystal cells on the front surface of the eyeglasses to synchronously drive the liquid crystal cells, alternately open and close the right and left visual fields for the stereoscopic image to separately view the stereoscopic image while causing a light-shielded state at the time of closing the visual fields to always reach its maximum even when the eyeglasses are tilted during appreciation, to prevent a crosstalk from occurring.

This configuration enables the configuration to be made simpler than that of the stereoscopic image appreciation eyeglasses as set forth in another embodiment.

The invention as set forth in another embodiment provides stereoscopic image appreciation eyeglasses for appreciating a stereoscopic image composed of right and left images to be alternately displayed by a time-division system with linear polarized light, the amplitude direction of which is one direction, the stereoscopic image appreciation eyeglasses being configured so that polarizing plates in the same direction are respectively arranged side by side in right and left visual fields of the eyeglasses, and a total of six liquid crystal cells, three liquid crystal cells overlaid on the right side and three liquid crystal cells overlaid on the left side each including a visual field opening/closing liquid crystal cell, a left tilt correcting liquid crystal cell, and a right tilt correcting liquid crystal cell, respectively, on front surfaces of the polarizing plates, to receive a synchronization signal radiated from an infrared light synchronization signal radiator attached along a stereoscopic image display device by an infrared light synchronization signal receiver placed on an eyeglass frame to synchronously drive the visual field opening/closing liquid crystal cells, alternately open and close the right and left visual fields for the stereoscopic image to separately view the stereoscopic image while driving and adjusting the left tilt correcting liquid crystal cells or the right tilt correcting liquid crystal cells installed one over the other on each of the right and left visual fields of the eyeglasses, as needed, using detection data of a tilt angle detector placed on the eyeglass frame so that a light-shielded state at the time of closing the visual fields always reaches its maximum even when the eyeglasses are tilted during appreciation, to prevent a crosstalk from occurring.

This configuration enables a tilt correction range to be enlarged to a wide range.

The invention as set forth in another embodiment provides a tilt angle detector for tilt correction of stereoscopic image appreciation eyeglasses, the tilt angle detector including a tilt angle detecting liquid crystal cell, an infrared polarizing filter, and an infrared sensor, and being configured as its functions so that a voltage to be applied to the tilt angle detecting liquid crystal cell, i.e., a checking voltage is gradually raised, and an output of the infrared sensor rapidly decreases, to enter a non-output state at the time point where the amplitude direction of polarized infrared light, which is optically rotated by the tilt angle detecting liquid crystal cell, enters a state orthogonal to the polarization direction of the infrared polarizing filter, and a voltage applied to the tilt angle detecting liquid crystal cell at the time point is sampled, to detect a tilt angle.

This configuration enables a tilt angle in a wide range (at a large angle) to be accurately detected.

The invention as set forth in another embodiment provides a tilt angle detector for tilt correction of stereoscopic image appreciation eyeglasses, the tilt angle detector being configured so that a first tilt angle detecting liquid crystal cell and a second tilt angle detecting liquid crystal cell are installed one over the other to enlarge an operation range, an infrared polarizing filter and an infrared sensor are arranged in this order behind the first and second tilt angle detecting liquid crystal cells, polarized infrared light radiated from a polarized infrared light synchronization signal radiator in a stereoscopic image display device is transmitted by the first tilt angle detecting liquid crystal cell and the second tilt angle detecting liquid crystal cell after its optical rotation has been adjusted thereby by applying a voltage to an electrode of the first tilt angle detecting liquid crystal cell and an electrode of the second tilt angle detecting liquid crystal cell after coupling the electrodes in series or in parallel or sequentially applying a voltage to the electrode of the first tilt angle detecting liquid crystal cell and the electrode of the second tilt angle detecting liquid crystal cell, the applied voltage is gradually raised, an output of the infrared sensor rapidly decreases to enter a non-output state at the time point where the amplitude direction of the polarized infrared light enters a state orthogonal to the polarization direction of the infrared polarizing filter, and a voltage applied to the liquid crystal cells at that time point is sampled, to detect a tilt angle.

This configuration enables an operation range to be further enlarged to a wider range than that of the tilt angle detector as set forth in another embodiment.

The invention as set forth in another embodiment provides a tilt angle detector for tilt correction of stereoscopic image appreciation eyeglasses, the tilt angle detector including infrared polarizing plates arranged side by side with their respective polarization directions tilted in opposite directions using a vertical line as an axis of symmetry and infrared sensors respectively installed at positions just behind the infrared polarizing plates, and being configured so that symmetry between the tilts of the infrared polarizing plates is destroyed when the eyeglasses are tilted so that a difference occurs in an amount of transmission of polarized infrared light serving as a basis for tilt correction, which has been radiated from a stereoscopic image display device, and the difference is used as an electrical output using the infrared sensor, to detect a tilt angle.

This configuration enables the tilt angle detector to be implemented in a significantly simple configuration.

The invention as set forth in another embodiment provides stereoscopic image appreciation eyeglasses, in which a slot for a diopter correction lens holder and a lens pressing spring are provided on a front surface or a rear surface of the eyeglasses.

This configuration enables a stereoscopic image appreciation eyeglasses tailored to the diopter of each of viewers by replacing the diopter correction lens.

The invention as set forth in another embodiment provides a diopter correction lens having both its ends formed in a circular arc shape and having its lower end formed in the shape of a curve or a straight line having a larger curvature than that of the circular arc shape at both the ends.

This configuration enables the diopter correction lens to be easily detachably attached while preventing the lens from rotating.

Advantageous Effects of Invention

The invention as set forth in an embodiment can embody a stereoscopic image display device that prevents a crosstalk in a simple configuration in which a polarized infrared light radiator is installed in a stereoscopic image display device of a type of alternately displaying right and left images by time division with polarized light in one direction, or an infrared polarizing filter is only attached along a synchronizing infrared light radiator. The invention has the effect of implementing accurate tilt angle detection and tilt correction with an electrooptical function by using polarized infrared light as a basis for tilt correction of stereoscopic image appreciation eyeglasses.

The invention as set forth in an embodiment has the effect of not causing a crosstalk even if liner polarized light is used as display light of a stereoscopic image. Only one polarizing plate is used for eyeglasses. Therefore, a light amount is hardly attenuated. Moreover, surrounding environmental light is unpolarized light so that a function of the eyeglasses does not affect the surrounding environmental light. This has the effects of not decreasing illuminance of surrounding illumination light or the like and eliminating the need to wear and remove the eyeglasses in work performed while viewing a stereoscopic display. The invention also has the effect of not causing a flicker even under illumination using a discharge lamp that is turned on at a commercial frequency.

Further, the invention has the advantage that a stable operation is ensured even if an operation range for tilt correction is set large because a tilt correcting liquid crystal is separately provided.

The invention as set forth in an embodiment has a similar effect to that of the invention as set forth in another embodiment, and has the effect of reducing the number of constituent elements to be used, i.e., liquid crystal cells. However, an operation range for tilt correction inevitably narrows.

The invention as set forth in an embodiment includes a left tilt correcting liquid crystal cell in a case where eyeglasses are tilted leftward and a right tilt correcting liquid crystal cell in a case where the eyeglasses are tilted rightward, and further has the effect of enlarging an operation range for tilt correction to a wide range (90° or more) in addition to the above-mentioned effect of another embodiment by using separate liquid crystal cells depending on a tilt direction.

The invention as set forth in an embodiment can rapidly detect an accurate tilt angle even if eyeglasses are greatly tilted. Therefore, the invention has the effect of stably maintaining correction in a wide range. The invention also has the effects of eliminating the need for fine adjustment during manufacture and during use as seen in a tilt angle detector of a mechanical type and having no extra vibration or the like.

The invention as set forth in an embodiment further has the effect of enlarging an operation range for tilt angle detection to a wide range (90° or more) in addition to the effect of the tilt angle detector as set forth in another embodiment by applying a control voltage to a first tilt angle detecting liquid crystal cell and a second tilt angle detecting liquid crystal cell serving as ones for tilt angle detection in series or in parallel after installing the liquid crystal cells one over the other or sequentially applying a voltage to an electrode of the first tilt angle detecting liquid crystal cell and an electrode of the second tilt angle detecting liquid crystal cell.

The invention as set forth in an embodiment has the effect of detecting a tilted state even in a simple configuration and completely preventing the occurrence of a crosstalk.

The invention as set forth in an embodiment further eliminates the need to use a diopter correction lens (eyeglasses usually used) and stereoscopic image appreciation eyeglasses one over the other for a person who requires a diopter correction lens in addition to the inventions as set forth in other embodiments. The invention also has the effect of selecting an optimum diopter correction lens depending on a distance from an object to be viewed.

The invention as set forth in an embodiment has the effect of easily inserting a diopter correction lens into a slot for a diopter correction lens holder in stereoscopic image appreciation eyeglasses by forming both ends of a diopter correction lens in a circular arc shape. The circular arc shape has the effect of preventing the lens from dropping out of the slot, combined with a spring installed into a holder portion in the eyeglasses. Further, the lens itself is prevented from rotating by forming its lower end into a curve or a straight line having a larger curvature than that of a circular arc at both the ends. This has the effect of an astigmatic axis not being changed if an astigmatic lens is used.

DESCRIPTION OF EMBODIMENTS

Figure 1:
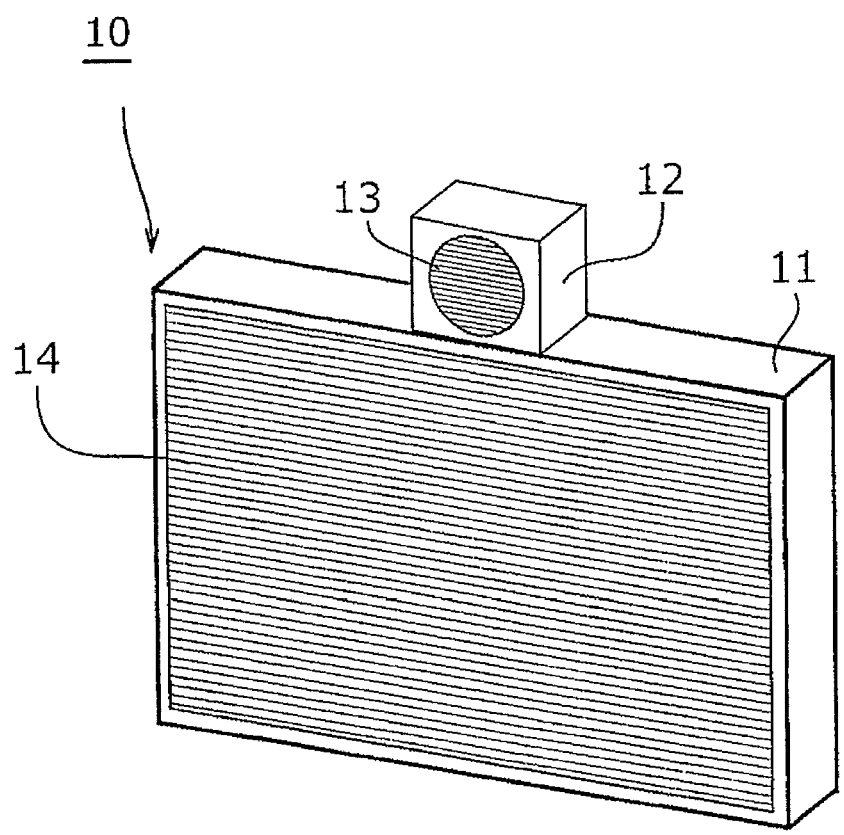
FIG. 1 is a perspective view of a stereoscopic TV according to the present invention.

The concept of the present invention will be described with reference to the drawings. FIG. 1 illustrates a stereoscopic image display device. The stereoscopic image display device includes an LCD stereoscopic television set (hereinafter referred to as a "stereoscopic TV"), for example, and alternately display right and left images by time division on a display 14. Simultaneously, a polarized infrared light synchronization signal radiator 12 installed on a main body 11 of the stereoscopic TV 10 has an infrared polarizing filter 13 attached along its surface, and generates a polarized infrared light synchronization signal.

Figure 2:
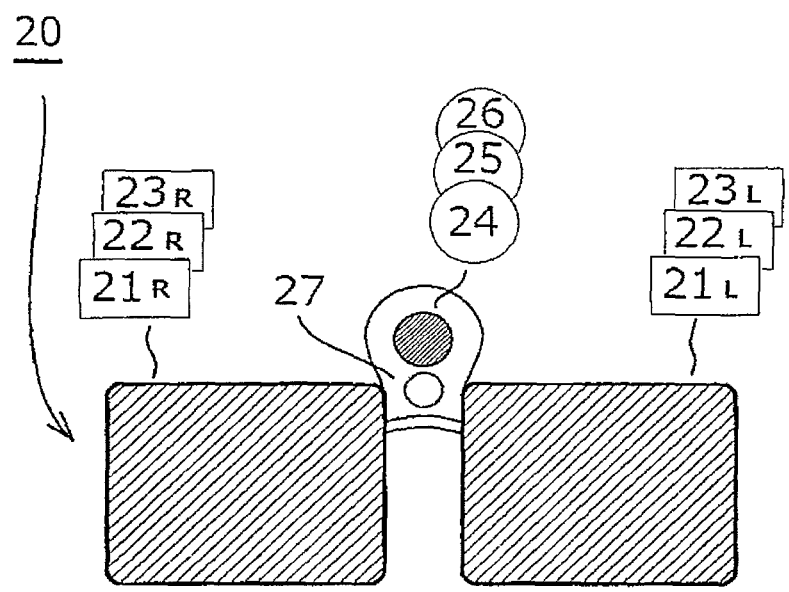
FIG. 2 is a front view of stereoscopic image appreciation eyeglasses according to the present invention.

FIG. 2 is a front view of stereoscopic image appreciation eyeglasses 20 serving as an embodiment of stereoscopic image appreciation eyeglasses according to the present invention. Right and left identical polarizing plates $23_R$ and $23_L$, the polarization direction of which has been tilted by 45° from the polarization direction of the display 14 in the above-mentioned stereoscopic TV 10, are arranged side by side, as illustrated, respectively, in right and left visual fields of the eyeglasses.

Further, two types of liquid crystal cells, i.e., visual field opening/closing liquid crystal cells $21_R$ and $21_L$ and tilt correcting liquid crystal cells $22_R$ and $22_L$ are respectively installed one over the other, respectively, on front surfaces of the polarizing plates $23_R$ and $23_L$. An infrared light synchronization signal receiver 27 and a tilt angle detector (a tilt angle detecting liquid crystal cell 24, an infrared polarizing filter 25, and an infrared sensor 26) are provided on an eyeglass frame.

Figure 3:
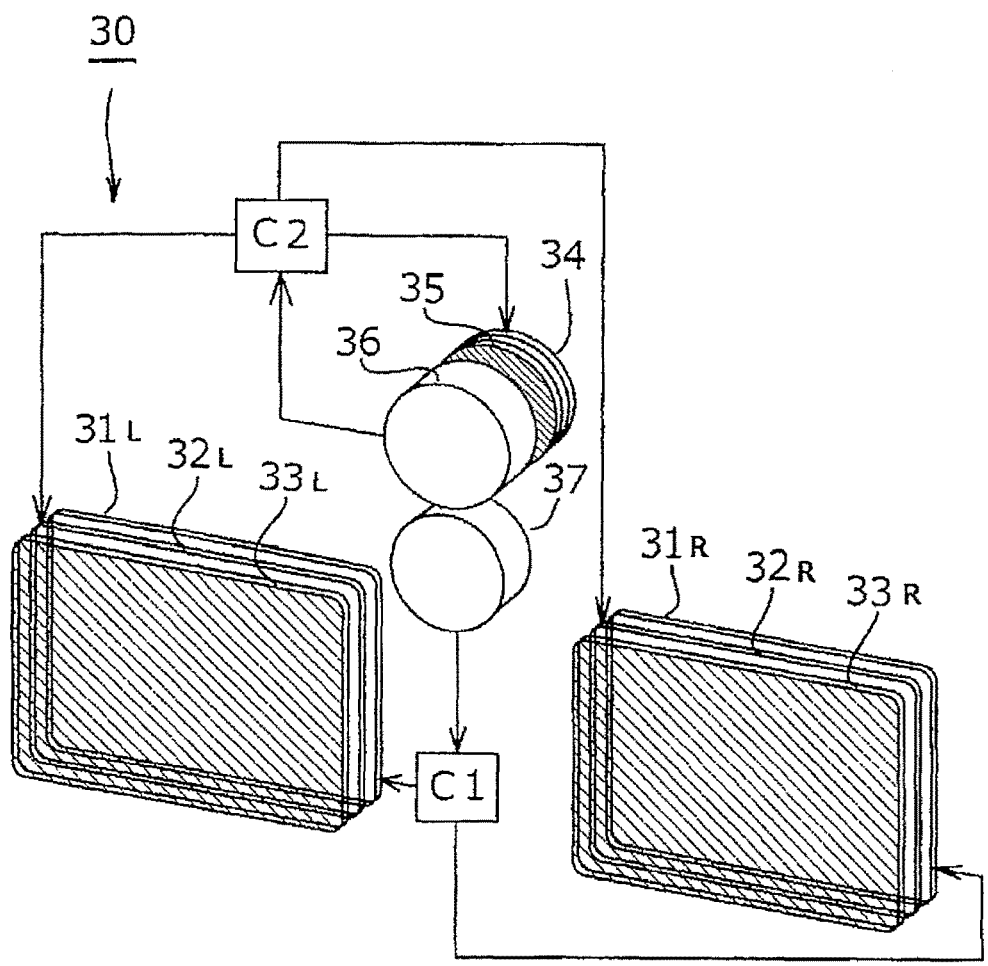
FIG. 3 is a diagram illustrating a configuration of stereoscopic image appreciation eyeglasses according to the present invention.

FIG. 3 is a diagram illustrating a configuration of the stereoscopic image appreciation eyeglasses illustrated in FIG. 2. An infrared light synchronization signal receiver 37, as illustrated, receives a synchronization signal using polarized infrared light (the synchronization signal need not be polarized) radiated via the infrared polarizing filter 13 in the stereoscopic TV 10. The received synchronization signal is sent to a controller C1, and is converted into a control voltage therein. The control voltage is applied to visual field opening/closing liquid crystal cells $31_R$ and $31_L$. Thus, visual fields of the stereoscopic image appreciation eyeglasses 30 are opened and closed in synchronization with display images that are alternately displayed by time division on the display 14 in the stereoscopic TV 10.

If a viewer tilts his/her head, an orthogonal state between the amplitude direction of the display image, optical rotation of which has been adjusted to open and close the visual fields, and polarizing plates $33_R$ and $33_L$ is destroyed, to enter a state where a crosstalk occurs. However, a configuration, using tilt correcting liquid crystal cells $32_R$ and $32_L$, of a tilt angle detector (including a tilt angle detecting liquid crystal cell 34, an infrared polarizing filter 35, and an infrared sensor 36) according to the present invention, illustrated in FIG. 3, is proposed to prevent the crosstalk from occurring by correcting the tilt of the eyeglasses. The tilt angle detector adjusts optical rotation of the polarized infrared light synchronization signal generated from the infrared polarizing filter 13 in the stereoscopic TV 10 using the tilt angle detecting liquid crystal cell 34 and analyzes the synchronization signal using the infrared polarizing filter 35, to detect a tilt angle. If such a function is described, a controller C2 first applies a voltage periodically (e.g., about several times per second) to the tilt angle detecting liquid crystal cell 34. If the applied voltage is gradually raised, an optically rotated state occurring by the tilt angle detecting liquid crystal cell 34 changes, and the amplitude direction of the polarized infrared light, which has been transmitted by the tilt angle detecting liquid crystal cell 34, enters a state orthogonal to the polarization direction of the infrared polarization filter 35. If the orthogonal state occurs, an output of the infrared sensor 36 rapidly decreases to enter a non-output state, to detect a tilt angle. A voltage applied to the tilt angle detecting liquid crystal cell 34 by the controller C2 at this time point is sampled, to detect a tilt angle.

Data representing the above-mentioned detected tilt angle for tilt correction is converted into a control voltage by the controller C2, and the control voltage is applied to the tilt correcting liquid crystal cells $32_R$ and $32_L$. If the viewer tilts his/her head, the orthogonal state at the time of closing the visual fields is destroyed, and a light beam to be blocked slightly slips through the polarizing plates $33_R$ and $33_L$ so that a crosstalk occurs. However, according to the present invention, the crosstalk, i.e., leaked light is corrected by the tilt correcting liquid crystal cells $32_R$ and $32_L$, to enter a state completely orthogonal to the polarizing plates $33_R$ and $33_L$. Thus, a light-shielded state at the time of closing the visual fields is always maintained at a maximum.

Figure 4:
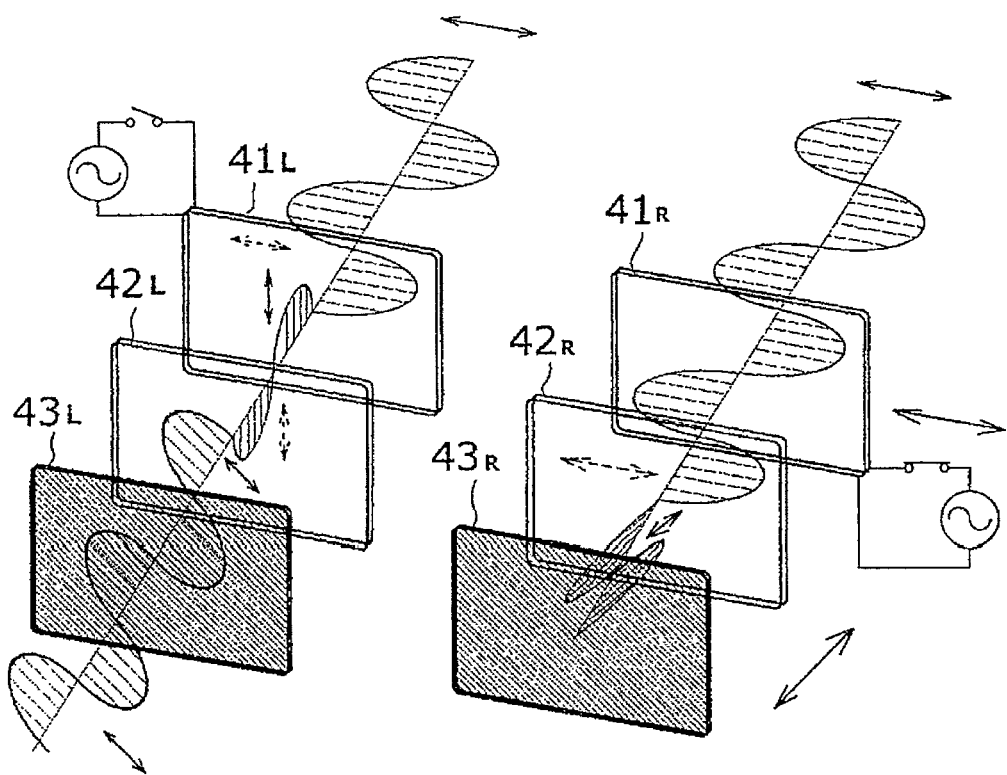
FIG. 4 is a diagram illustrating an operating condition of the stereoscopic image appreciation eyeglasses according to the present invention.

FIG. 4 is a diagram illustrating an optically rotated state of the stereoscopic image appreciation eyeglasses 30. If display light by the display 14 in the stereoscopic TV illustrated in FIG. 1, described above, is polarized light vibrating in a horizontal direction, for example, the display light is incident on right and left visual fields of the eyeglasses illustrated in FIG. 4. In the left visual field, no voltage is applied to a visual field opening/closing liquid crystal cell $41_L$ because a switch, as illustrated, is in an opened state so that the display light vibrating in the horizontal direction is transmitted by the visual field opening/closing liquid crystal cell $41_L$ after being optically rotated by 90° therein, to vibrate in a vertical (up-and-down) direction. On the other hand, in the right visual field, a voltage is applied to a visual field opening/closing liquid crystal cell $41_R$ because a switch, as illustrated, is in a closed state so that the display light is transmitted by a visual field opening/closing liquid crystal cell $41_R$ in the state of vibrating in the horizontal direction. The right and left switches are actually set to be alternately opened and closed automatically in synchronization with the display light in response to the infrared light synchronization signal. Therefore, the display lights, which have been transmitted by the visual field opening/closing liquid crystal cells $41_R$ or $41_L$, are always in a state orthogonal to each other between the right and left visual fields. (However, if the right and left visual fields of the stereoscopic image appreciation eyeglasses are also switched simultaneously with the switching of the right and left images to be alternately displayed by time division on an LCD of the stereoscopic TV, the right and left images of the stereoscopic TV may interfere with each other. To avoid the interference, the right and left visual fields of the eyeglasses need to be simultaneously closed for a predetermined period (a period slightly longer than a period of time during which the right and left images of the stereoscopic TV are switched) at the time point where the right and left images of the stereoscopic TV are switched. Therefore, the display lights may not instantaneously be in the orthogonal state.) A method for turning off a backlight of the stereoscopic TV when the visual fields of the eyeglasses are switched is also implemented. An arrow representing the amplitude direction, on the near side of each of the liquid crystal cells, of the display light is indicated by a solid line, and an arrow representing the amplitude direction, on the far side thereof, of the display light is indicated by a broken line.

The right and left display lights, which have been transmitted by the visual field opening/closing liquid crystal cells 41, as described above, are respectively incident on tilt correcting liquid crystal cells 42 with the amplitude directions being orthogonal to each other. As illustrated in FIG. 4, for example, the display light is incident in the state of vibrating in a vertical (up-and-down) direction in the left visual field. At this time, the display light is incident in the state of vibrating in a horizontal (right-and-left) direction in the right visual field. If the tilt correcting liquid crystal cell 42 is a TN mode liquid crystal, for example, and its operation range (angle) is 90°, a bias voltage is always applied to the tilt correcting liquid crystal cell 42 so that the display light enters the state of being optically rotated by 45° that is one-half of 90°. The controller C2 converts data representing the above-mentioned detected tilt angle data into a control voltage, and adds and subtracts the control voltage to and from the bias voltage, to drive the tilt correcting liquid crystal cell 42. Since the tilt correcting liquid crystal cells $42_R$ and $42_L$ are driven in parallel (in the same direction and simultaneously on the right and left sides), the display lights in the right and left visual fields are maintained in a state orthogonal to each other even after being transmitted by the tilt correcting liquid crystal cells 42. For example, the display light, which has been transmitted by the visual field opening/closing liquid crystal cell $41_L$ in the left visual field, vibrates in the vertical direction, and is directed toward the polarizing plate $43_L$ in the state of being optically rotated by 45° by the tilt correcting liquid crystal cell $42_L$ (being maintained at 45° by the bias voltage). The polarization direction of the polarizing plate $43_L$ is fixed to 45° parallel to the amplitude direction of the display light, which has been transmitted by the tilt correcting liquid crystal cell $42_L$. Therefore, the display light is transmitted by the polarizing plate $43_L$, to enter a visual field opened state. On the other hand, the amplitude direction of the display light, which has been transmitted by the tilt correcting liquid crystal cell $42_R$ in the right visual field, is in a state orthogonal to that in the left visual field. Thus, the amplitude direction of the display light enters a state orthogonal to the right polarizing plate $43_R$ disposed with its polarization direction being parallel to the left polarizing plate $43_L$. Therefore, the display light cannot be transmitted by the polarizing plate $43_R$, to enter a visual field closed state.

As described above, the stereoscopic image appreciation eyeglasses 30 illustrated in FIG. 3 in the present invention perform a shutter function for stereoscopic image display light of the stereoscopic TV 10 illustrated in FIG. 1. However, ambient light (surrounding environmental light) is non-polarized light, and vibrates in all directions orthogonal to its travel direction. Therefore, the ambient light is affected by neither the visual field opening/closing liquid crystal cell $31_R$ and $31_L$ nor the tilt correcting liquid crystal cells $32_R$ and $32_L$. Therefore, there is no decrease in light amount by the shutter function (conventional liquid crystal shutter eyeglasses also have a shutter function for environmental light, and respective light amounts in right and left visual fields are one-half or less if the right and left visual fields are alternately opened and closed). The fact that there is no shutter function for the surrounding environmental light also has the effect of not causing a flicker due to interference with illumination light. Moreover, only one polarizing plate is used so that not only the stereoscopic TV but also all the visual fields including a surrounding environment look bright. Therefore, this is significantly advantageous in stereoscopic view involving work.

If the stereoscopic image display light, the amplitude direction of which is a horizontal direction, is transmitted by the visual field opening/closing liquid crystal cells $31_R$ and $31_L$, the amplitude direction of the transmitted light is either a horizontal direction or a vertical direction in the right and left visual fields. More specifically, the visual field takes two values, i.e., "opened" or "closed". An intermediate value other than the two values is not preferable because a visual field becomes dark or a crosstalk occurs. Accordingly, the visual field opening/closing liquid crystal needs to be high in response speed. A II-type (OCB (Optically Compensated Birefringence)) liquid crystal, or a ferroelectric liquid crystal (SSFLCD (Surface Stabilized Ferroelectric Liquid Crystal Device), PSS-LCD (Polarization Shielded Smectic Liquid Crystal Device)) is suitable for such an application.

A case where the eyeglasses are put horizontally has been described above. The polarizing plates $33_R$ and $33_L$, together with the eyeglasses, are tilted with the eyeglasses tilted so that their respective tilt angles are different from the above-mentioned angle of 45°. Therefore, the orthogonal state at the time of closing the visual fields is destroyed. If this remains so, a crosstalk occurs. If the eyeglasses are tilted, therefore, the light-shielded state at the time of closing the visual fields is always maintained at a maximum by detecting the tilt angle of the eyeglasses using a tilt angle sensor placed on the eyeglasses, and adding or subtracting a tilt correcting control voltage to or from a bias voltage, to correct the amplitude direction of the display light directed toward the polarizing plates $33_R$ and $33_L$ to always enter a state orthogonal to the polarization direction of the polarizing plates $33_R$ and $33_L$ when the visual fields are closed.

While the tilt of the eyeglasses has been corrected by detecting the tilt angle to adjust an optically rotatable state by the tilt correcting liquid crystal cells $32_R$ and $32_L$, a checking voltage may be applied to the tilt angle detecting liquid crystal cell 34 (by the controller C2) at a frequency of approximately several times per second. This is because a person does not shake his/her head at a so high speed when the person tilts his/her head. Even in a period during which the checking voltage is not applied to the tilt angle detecting liquid crystal cell 34 because the tilt angle is intermediately detected, however, corrected states of the tilt correcting liquid crystal cells $32_R$ and $32_L$ need to be held in a certain state. The corrected state, which has been updated when the tilt angle is detected, is held until the next tilt angle is detected, and such an operating condition is always repeatedly continued so that a visually tilted state is always maintained in a horizontal state even if the stereoscopic image appreciation eyeglasses are tilted in any direction. Therefore, a crosstalk is prevented from occurring.

While the tilt correcting liquid crystal cell $32_R$, $32_L$ is disposed behind the visual field opening/closing liquid crystal cell $31_R$, $31_L$ in the embodiment described in FIG. 3 in the present invention, either one of the liquid crystal cells may be disposed behind the other liquid crystal cell.

A high response speed is not required for the tilt correcting liquid crystal cells $32_R$ and $32_L$. This is because the speed at which the person tilts his/her head is significantly lower than a response speed of the liquid crystal, as described above. Therefore, a conventional TN mode liquid crystal is sufficient. Since an operation range (for optical rotation) of the TN mode liquid crystal is 90°, an intermediate position between a position where the head is tilted rightward and a position where the head is tilted leftward is a horizontal position, a voltage may be applied (a bias voltage) so that the tilt correcting liquid crystal cell 32 enters a state of being optically rotated by 45°, which is an intermediate value, with the eyeglasses horizontally put.

There is a case where respective applied voltages and characteristics of optically rotated states of the tilt angle detecting liquid crystal cell 34 and the tilt correcting liquid crystal cells $32_R$ and $32_L$ may be unproportional to each other. However, in the case, an optical rotation angle can be accurately controlled by a program in which a corrected value is adjusted depending on a parameter in the controller C2.

Figure 5:
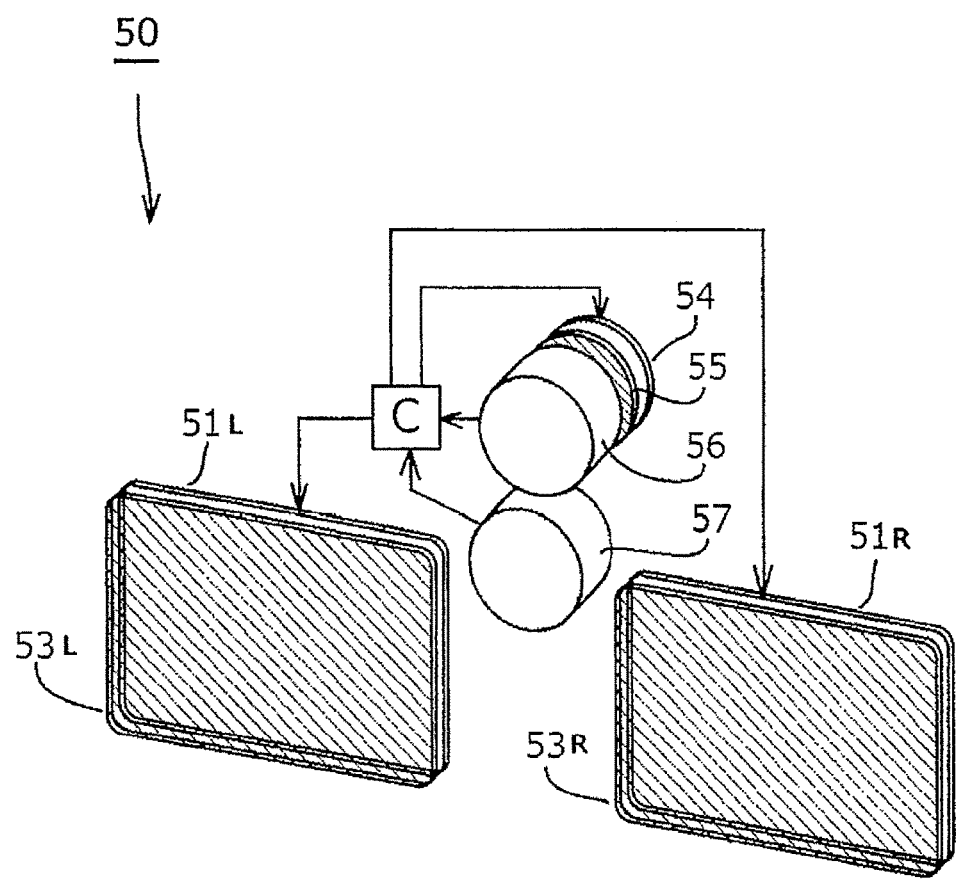
FIG. 5 is a diagram illustrating another embodiment of the stereoscopic image appreciation eyeglasses according to the present invention.

FIG. 5 illustrates another embodiment of stereoscopic image appreciation eyeglasses. On a frame of stereoscopic image appreciation eyeglasses 50 illustrated in FIG. 5, a tilt angle detector including a tilt angle detecting liquid crystal cell 54, an infrared polarizing filter 55, and an infrared sensor 56 is placed. The stereoscopic image appreciation eyeglasses are configured to calculate detection data of the tilt angle detector and synchronization signal data of a synchronization signal receiver 57 (a tilt angle detecting method and a synchronization signal receiving method themselves are identical to those according to an embodiment, described above) using a controller C, synchronously drive visual field opening/closing and tilt correcting liquid crystal cells $51_R$ and $51_L$, alternately open and close visual fields for display light of the stereoscopic image display device 10 to perform stereoscopic viewing while performing control so that the display light of the stereoscopic image display device, which has been transmitted by the visual field opening/closing and tilt correcting liquid crystal cells $51_R$ and $51_L$, always enter a state orthogonal to the polarization directions of polarizing plates $53_R$ and $53_L$ when the visual fields are closed so that a light-shielded state at the time of closing the visual fields always reaches its maximum, to prevent a crosstalk from occurring.

While high-speed responsiveness is required as a material for the visual field opening/closing and tilt correcting liquid crystal cells $51_R$ and $51_L$ in the stereoscopic image appreciation eyeglasses having the above-mentioned configuration, an SSFLCD cannot be used. This is because the SSFLCD has a sharp function and cannot display an intermediate value (cannot perform tilt correction). The stereoscopic image appreciation eyeglasses in the configuration according to an embodiment can be made smaller in the number of parts while being slightly narrower in a tilt correction range than in the above-mentioned configuration according to another embodiment.

As a tilt angle detector required to apply a correcting voltage to the tilt correcting liquid crystal cells $32_R$ and $32_L$ illustrated in FIG. 3 and the liquid crystal cells $51_R$ and $51_L$ illustrated in FIG. 5 in the present invention, described above, a gravity sensor (of a type of detecting an angle of a pendulum or the like and finally converting the angle into an electrical output or a type of finally converting a change in a liquid surface into an electrical output using a liquid surface) and a gyro sensor (e.g., a piezoelectric gyro) can be used. Since the sensors can independently detect the tilt angle of eyeglasses, polarized infrared light serving as a basis for tilt correction is not required. Therefore, the infrared polarizing filter 13 in the stereoscopic TV 10 illustrated in FIG. 1 is not required in the case.

Figure 6:
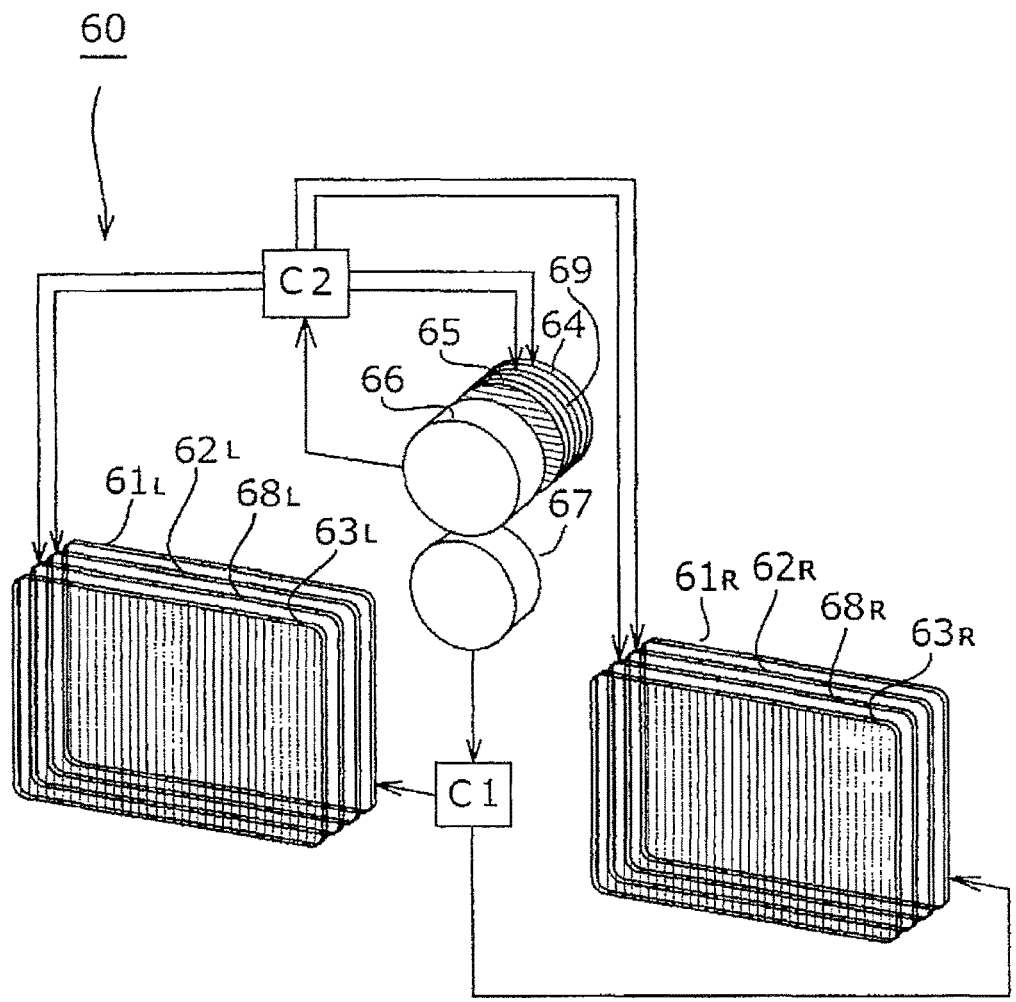
FIG. 6 is a diagram illustrating still another embodiment of the stereoscopic image appreciation eyeglasses according to the present invention.

FIG. 6 illustrates another embodiment of stereoscopic image appreciation eyeglasses according to the present invention, where polarizing plates 63 are respectively arranged side by side in right and left visual fields of the eyeglasses. A left tilt correcting liquid crystal cell 62 and a right tilt correcting liquid crystal cell 68, which are opposite in torsional direction, are installed one over the other on a front surface of the polarizing plate 63. Further, a visual field opening/closing liquid crystal cell 61 is further installed on the front surface of the left tilt correcting liquid crystal cell 62. A synchronization signal receiver 67 receives an infrared light synchronization signal radiated from the polarized infrared light synchronization signal radiator 12 in the stereoscopic TV 10 illustrated in FIG. 1, and a controller C1 converts the synchronization signal into a control voltage and applies the control voltage to the visual field opening/closing liquid crystal cells $61_R$ and $61_L$, to open and close right and left visual fields. A state of right and left display lights in this case is equal to that when the right and left display lights are respectively transmitted by the visual field opening/closing liquid crystal cells $41_R$ and $41_L$, described with reference to FIG. 4. In this state, the right and left display lights are in a state where their respective amplitude directions are always orthogonal to each other. The polarized right and left display lights, which vibrate in a state orthogonal to each other, are transmitted by the left tilt correcting liquid crystal cells $62_R$ and $62_L$ and the right tilt correcting liquid crystal cells $68_R$ and $68_L$. If no voltage is applied to the left tilt correcting liquid crystal cells $62_R$ and $62_L$ and the right tilt correcting liquid crystal cells $68_R$ and $68_L$ however, the display lights are optically rotated once by the left tilt correcting liquid crystal cells $62_R$ and $62_L$ while being returned by the right tilt correcting liquid crystal cells $68_R$ and $68_L$, which is opposite in torsional direction to the left tilt correcting liquid crystal cells $62_R$ and $62_L$. This is the same as a state where the left tilt correcting liquid crystal cells $62_R$ and $62_L$ and the right tilt correcting liquid crystal cells $68_R$ and $68_L$ are not installed. Right and left images, which are analyzed by the polarizing plates $63_R$ and $63_L$ and are displayed by time division on the display 14 in the stereoscopic TV 10, are separated.

In the above-mentioned state, if the eyeglasses are tilted, an orthogonal state between the amplitude direction of the display lights at the time of closing the visual fields and the polarization direction of the polarizing plates $63_R$ and $63_L$ is destroyed so that a crosstalk may occur. In such a case, a TN (Twisted Nematic) mode liquid crystal is used for the left tilt correcting liquid crystal cells $62_R$ and $62_L$ and right tilt correcting liquid crystal cells $68_R$ and $68_L$, for example. The left tilt correcting liquid crystal cells $62_R$ and $62_L$ perform correction when the eyeglasses are tilted leftward, and the right tilt correcting liquid crystal cells $68_R$ and $68_L$ perform correction when the eyeglasses are tilted rightward so that the tilt of the eyeglasses can be corrected by a total of 180°, 90° rightward and 90° leftward. In this case, a bias need not be applied to the left tilt correcting liquid crystal cells $62_R$ and $62_L$ and the right tilt correcting liquid crystal cells $68_R$ and $68_L$. If an STN (Super Twisted Nematic) mode liquid crystal is used instead of a case where two TN mode liquid crystals are used one over the other, the number of light crystal cells may be one. Two TN mode liquid crystals are to be used one over the other in consideration of the need to apply a bias thereto when the posture of the eyeglasses is in a horizontal state, and a problem of color displacement and a difficulty of fine adjustment because of a steep tilt, which are characteristic of the STN mode liquid crystal.

To correct the tilt by a total of 180°, 90° rightward and 90° leftward, described above, a tilt angle of 180° needs to be detected. A first tilt angle detecting liquid crystal cell 64 and a second tilt angle detecting liquid crystal cell 69, which are illustrated as a tilt angle detector in FIG. 6, can also be optionally rotated by 180° if one STN mode liquid crystal is used. The problem of color displacement is ignored if the STN mode liquid crystal is for tilt angle detection. However, the STN mode liquid crystal is unsuitable because it is difficult to finely adjust because its tilt is steep. Therefore, a controller C2 applies a voltage to the first tilt angle detecting liquid crystal cells 64 and the second tilt angle detecting liquid crystal cell 69, as illustrated, after overlaying the first tilt angle detecting liquid crystal cell 64 and the second tilt angle detecting liquid crystal cell 69 in a state, as illustrated, while coupling respective electrodes of the first tilt angle detecting liquid crystal cell 64 and the second tilt angle detecting liquid crystal cell 69 in a series state or a parallel state. The applied voltage is gradually raised so that polarized infrared light that is transmitted by the first tilt angle detecting liquid crystal cell 64 and the second tilt angle detecting liquid crystal cell 69, which are doubly overlaid, are adjusted to be optically rotated by 0 to 180°. Accordingly, the tilt angle is detected by applying a voltage to the first tilt angle detecting liquid crystal cell 64 and the second tilt angle detecting liquid crystal cell 69 after coupling the liquid crystal cells 64 and 69 in series or in parallel, and sampling a voltage at the time point where an output of an infrared sensor 66, as illustrated, rapidly decreases to enter a non-output state. A tilt angle of a total 180°, 90° rightward and 90° leftward, can be detected by a similar function to that in the method for detecting the tilt angle of the stereoscopic image appreciation eyeglasses having the above-mentioned configuration illustrated in FIG. 3. Naturally, a voltage applied when the first tilt angle detecting liquid crystal cell 64 and the second tilt angle detecting liquid crystal cell 69 are coupled in series becomes two times that when they are coupled in parallel (in a case where their respective optical rotation functions are the same). Even if a voltage is applied to either one of the first tilt angle detecting liquid crystal cell 64 and the second tilt angle detecting liquid crystal cell 69, and a voltage is sequentially applied to the other tilt angle detecting liquid crystal cell when the applied voltage reaches (exceeds) a prescribed maximum value, a similar function to that when the first and second tilt angle detecting liquid crystal cells 64 and 69 are coupled in serial or in parallel is produced.

When the left tilt correcting liquid crystal cells $62_R$ and $62_L$ and the right tilt correcting liquid crystal cells $68_R$ and $68_L$, which are respectively installed in visual fields of the eyeglasses, are tilted leftward or rightward from a horizontal state, they are set to separately operate for leftward tilt or rightward tilt so that a bias need not be applied thereto.

Figure 7:
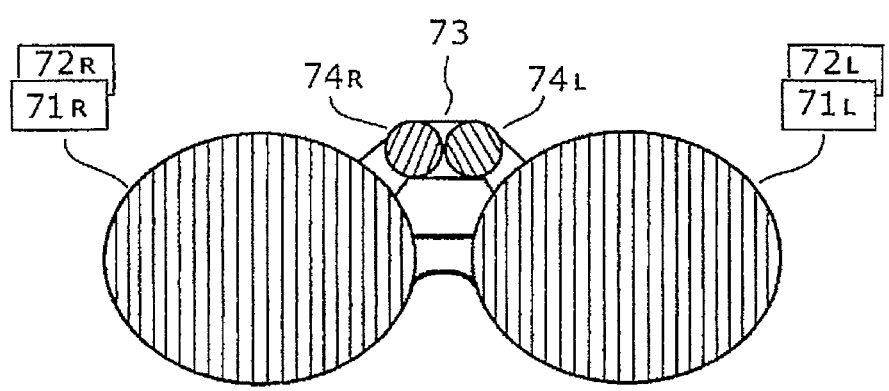
FIG. 7(a) is a front view illustrating another embodiment of the stereoscopic image appreciation eyeglasses according to the present invention.
FIG. 7(b) is a diagram illustrating a configuration of a tilt angle detector illustrated in FIG. 7(a).
Figure 7:
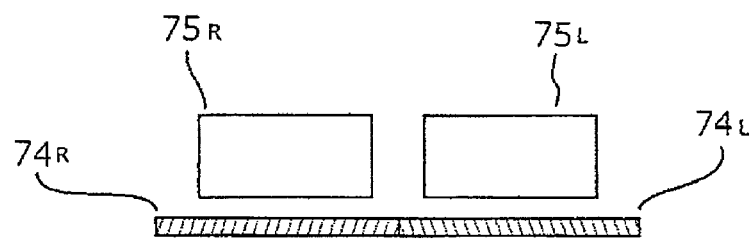

FIG. 7 illustrates a content discussed in Japanese Patent Laid-Open No. 2009-274002 (stereoscopic image appreciation eyeglasses) previously filed by the present applicant, where a polarizing plate 72 in a vertical (up-and-down) direction is installed in right and left visual fields of eyeglasses illustrated in FIG. 7(a). Liquid crystal cells $71_R$ and $71_L$ are attached to a front surface of the polarizing plate 72. FIG. 7(b) is a detailed view of a synchronization signal receiver 73 for opening and closing the visual fields of the eyeglasses in synchronization with a display image for a stereoscopic TV, and illustrates a method for detecting a tilt angle. Its functions will be described below.

The infrared polarizing filter 13 on the radiation surface of the infrared light synchronization signal radiator 12 attached along the stereoscopic image display device 10 illustrated in FIG. 1 changes synchronizing infrared light into polarized infrared light. The polarization direction of infrared polarizing filters $74_R$ and $74_L$ in the synchronization signal receiver 73 is arranged in a symmetrically tilted state, as illustrated in FIG. 7(a) when the eyeglasses are put horizontally. In this case, respective outputs of infrared sensors $75_R$ and $75_L$ are equal to each other. If the eyeglasses are tilted either rightward or leftward from this state, a difference occurs between the outputs of the infrared sensors $75_R$ and $75_L$. A tilt angle can be detected by previously examining a relationship between the output difference and the tilt.

Figure 8:
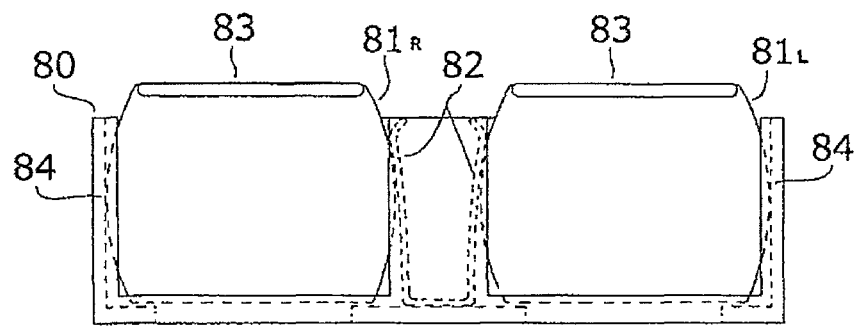
FIG. 8 is a front view illustrating an embodiment of stereoscopic image appreciation eyeglasses along which a diopter correction lens holder is attached.

FIG. 8 illustrates a diopter correction lens optionally attached along stereoscopic image appreciation eyeglasses and an attachment portion. A person's eyesight (diopter) differs from individual to individual. Even in a usual life, many persons use diopter correcting eyeglasses. Even in an object to be viewed, there are a case where a small screen of a personal computer is viewed at a close distance and a case where a relatively large TV is viewed at a slightly far distance. The need to switch eyeglasses depending on a distance from the object also arises. Particularly, a person using reading glasses needs to change the diopter of a correction lens (replace eyeglasses usually used) depending on a distance from the object to be viewed. Accordingly, in stereoscopic image appreciation eyeglasses, i.e., visual field separating eyeglasses, diopter correcting eyeglasses need to be used from individual to individual. However, in the actual situation, the stereoscopic image appreciation eyeglasses are overlaid on the eyeglasses usually used. However, using two types of eyeglasses one over the other is unstable, and is troublesome. Therefore, stereoscopic image appreciation eyeglasses for personal use incorporating a diopter correction lens tailored to the individual can also be prepared. However, a problem occurring when the diopter correction lens is fixed, tailored to the individual is that the stereoscopic image appreciation eyeglasses for personal use cannot be diverted to one for another person (their respective diopters do not match each other). The stereoscopic image appreciation eyeglasses need to be changed depending on an object (a TV or a PC) to be viewed even for personal use.

The best method for solving the above-mentioned problem is to provide a slot for a lens holder on a front surface or a rear surface of the stereoscopic image appreciation eyeglasses and insert the diopter correction lens, as needed. FIG. 8 illustrates a holder (a slot) for retaining the diopter correction lens on the front surface of the stereoscopic image appreciation eyeglasses. The holder is molded integrally with an eyeglass frame (illustration of its main body portion is omitted). A holder portion 80, as illustrated, is provided with a slot 84 into which diopter correction lenses $81_R$ and $81_L$ are to be inserted. The diopter correction lenses $81_R$ and $81_L$, which have been inserted into the slot 84, are pressed against the slot 84 using a leaf spring 82. The diopter correction lenses $81_R$ and $81_L$, which have been simultaneously inserted once, do not easily drop off even if the eyeglasses are turned upside down by a shape of the leaf spring 82 and a spring effect.

The diopter correction lens 81 has its right and left ends formed in a circular arc shape. The circular arc shape makes insertion into the slot 84 easy. Further, upper and lower ends of the diopter correction lens 81 are formed in a linear shape, to prevent the diopter correction lenses $81_R$ and $81_L$ from rotating (functionally, only the lower end may have a linear shape). Such a rotation preventing function is significantly effective when an astigmatic lens is required as the diopter correction lens. This is because astigmatism correction is performed in a specific direction (angle) so that the diopter correction lens needs to be fixed at a specific position in a rotational direction. A knob 83, as illustrated, has a structure in which aluminum is folded and held therein or is bonded thereto, and can identify the lens by increasing a frictional force against fingers when it is detachably attached to the slot 84 and not only preventing the lens from being contaminated but also being marked.

The stereoscopic image appreciation eyeglasses according to the present invention do not react with ambient light. Therefore, a work environment visual field looks bright in work performed while observing a stereoscopic image. Therefore, the eyeglasses need not be removed even during work other than viewing of a monitor. The function and effect of the stereoscopic image appreciation eyeglasses having this configuration are great.

Various modifications can be made as long as they do not depart from the spirit of the present invention, and the present invention naturally covers the modifications.

INDUSTRIAL APPLICABILITY

Stereoscopic image appreciation eyeglasses according to the present invention are particularly visual field separating eyeglasses for separating right and left visual fields of a stereoscopic image, which is displayed by time division on a television set made of an LCD or a personal computer, to perform stereoscopic viewing, and will be hereafter essential in applications from general appreciation of a stereoscopic image to appreciation of a stereoscopic image such as various types of simulation, education and training, inspection, medical care, and advertisement.

REFERENCE SIGNS LIST 10 stereoscopic image display device
11 stereoscopic image display device main body
12 polarized infrared light synchronization signal radiator
13 infrared polarizing filter
14 display
20 stereoscopic image appreciation eyeglasses
$21_R$, $21_L$ visual field opening/closing liquid crystal cell
$22_R$, $22_L$ tilt correcting liquid crystal cell
$23_R$, $23_L$ polarizing plate
24 tilt angle detecting liquid crystal cell
25 infrared polarizing filter
26 infrared sensor
27 synchronization signal receiver
C1 visual field opening/closing controller
C2 tilt correcting controller
30 stereoscopic image appreciation eyeglasses
$31_R$, $31_L$ visual field opening/closing liquid crystal cell
$32_R$, $32_L$ tilt correcting liquid crystal cell
$33_R$, $33_L$ polarizing plate
34 tilt angle detecting liquid crystal cell
35 infrared polarizing filter
36 infrared sensor
37 synchronization signal receiver
$41_R$, $41_L$ visual field opening/closing liquid crystal cell
$42_R$, $42_L$ tilt correcting liquid crystal cell
$43_R$, $43_L$ polarizing plate
50 stereoscopic image appreciation eyeglasses
C visual field opening/closing and tilt correcting controller
$51_R$, $51_L$ visual field opening/closing and tilt correcting liquid crystal cell
$53_R$, $53_L$ polarizing plate
54 tilt angle detecting liquid crystal cell
55 infrared polarizing plate
56 infrared sensor
57 synchronization signal receiver
60 stereoscopic image appreciation eyeglasses
$61_R$, $61_L$ visual field opening/closing liquid crystal cell
$62_R$, $62_L$ left tilt correcting liquid crystal cell
$63_R$, $63_L$ polarizing plate
64 first tilt angle detecting liquid crystal cell
65 infrared polarizing filter
66 infrared sensor
67 synchronization signal receiver
$68_R$, $68_L$ right tilt correcting liquid crystal cell
69 second tilt angle detecting liquid crystal cell
$71_R$, $71_L$ visual field opening/closing and tilt correcting liquid crystal cell
$72_R$, $72_L$ polarizing plate
73 infrared light synchronization signal receiver
$74_R$, $74_L$ infrared polarizing plate
$75_R$, $75_L$ infrared sensor
80 lens holder
$81_R$, $81_L$ diopter correction lens
82 leaf spring
83 knob
84 slot portion

The invention claimed is:

1. A stereoscopic image display device that alternately displays right and left images by time division with polarized display light in one direction, the stereoscopic image display device comprising an infrared light synchronization signal radiator for visual field opening/closing, and the infrared light synchronization signal radiator being configured to radiate polarized infrared light in a direction common to one direction of the polarized display light used as a basis for tilt correction with the use of an infrared polarizing filter along the infrared light synchronization signal radiator for visual field opening/closing as a basis for tilt correction of stereoscopic image appreciation eyeglasses or separately with the use of a polarized infrared light radiator for tilt correction.

2. A stereoscopic display device providing left and right alternately displayed images by time division with polarized light comprising:
a display, said display capable of displaying the left and right alternately displayed images by time division with the polarized display light; and
a polarized synchronization radiator comprising an infrared radiation source and an infrared polarizing filter providing linear polarized synchronization radiation propagating in a common direction with the polarized display light whereby the linear polarized synchronization radiation having a predetermined angle of linear polarization is used to determine a tilt of stereoscopic image appreciation eyeglasses receiving the polarized display light and the linear polarization synchronization radiation and worn by a viewer of said display.

3. A stereoscopic display device comprising:

an LCD stereoscopic television, said LCD stereoscopic television displaying left and right alternately displayed images by time division with linearly polarized display light;

an infrared light synchronization signal radiator placed adjacent said LCD stereoscopic television generating an infrared light synchronization signal, said infrared light synchronization signal synchronized with the left and right alternately displayed images on said LCD stereoscopic television, whereby the left and right alternately displayed images are capable of being viewed by a viewer with stereoscopic image appreciation eyeglasses providing a stereoscopic view; and an infrared polarizing filter placed adjacent said infrared light synchronization signal radiator providing linear polarized synchronization radiation propagating in a common direction with the display polarized light, whereby the linear polarized synchronization radiation is used to detect a tilt of the stereoscopic image appreciation eyeglasses having an infrared polarizing filter and an infrared sensor receiving the linearly polarized display light and the linear polarized synchronization radiation and permitting a tilt correcting cell to make an angular adjustment of the a direction of polarization of the linearly polarized display light entering the stereoscopic image appreciation eyeglasses so as to prevent crosstalk or leaked light.

* * * * *